United States Patent
Kawagoshi

(10) Patent No.: US 6,512,342 B2
(45) Date of Patent: Jan. 28, 2003

(54) BRUSHLESS MOTOR DRIVING DEVICE

(75) Inventor: Hirokazu Kawagoshi, Shiga (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 10/057,158

(22) Filed: Jan. 25, 2002

(65) Prior Publication Data

US 2002/0097014 A1 Jul. 25, 2002

(30) Foreign Application Priority Data

Jan. 25, 2001 (JP) .......................................... 2001-017213

(51) Int. Cl.[7] ................................................. H02P 7/06
(52) U.S. Cl. ....................... 318/254; 318/138; 318/439; 318/61; 318/90; 388/847
(58) Field of Search ................................. 318/254, 138, 318/439, 61, 90; 388/847

(56) References Cited

U.S. PATENT DOCUMENTS

| | | | | |
|---|---|---|---|---|
| 5,384,527 A | * | 1/1995 | Rozman et al. | 318/254 |
| 5,397,972 A | * | 3/1995 | Maiocchi | 318/254 |
| 5,703,449 A | * | 12/1997 | Nagate et al. | 318/254 |
| 5,717,298 A | * | 2/1998 | Tang et al. | 318/254 |

FOREIGN PATENT DOCUMENTS

JP 57-173385 10/1982

* cited by examiner

Primary Examiner—Rita Leykin
(74) Attorney, Agent, or Firm—Choate, Hall & Stewart

(57) ABSTRACT

A brushless motor driving device is so configured to control excitation of each phase armature coil an the basis of starting patterns supplied from a start circuit in a starting operation and a rotator position signal obtained from an induced voltage generated between opposite ends of each phase armature coil after completion of the starting operation, thereby to rotate a rotator. The start circuit includes a main counter generates a pulse at each time the main counter counts a clock signal to a variable full count value, a sub counter counts the pulse generated by the main counter, the variable full count value being subtracted by a count value of the sub counter, and a star pattern generating circuit generating a starting pattern in response to the pulse generated by the main counter.

6 Claims, 12 Drawing Sheets

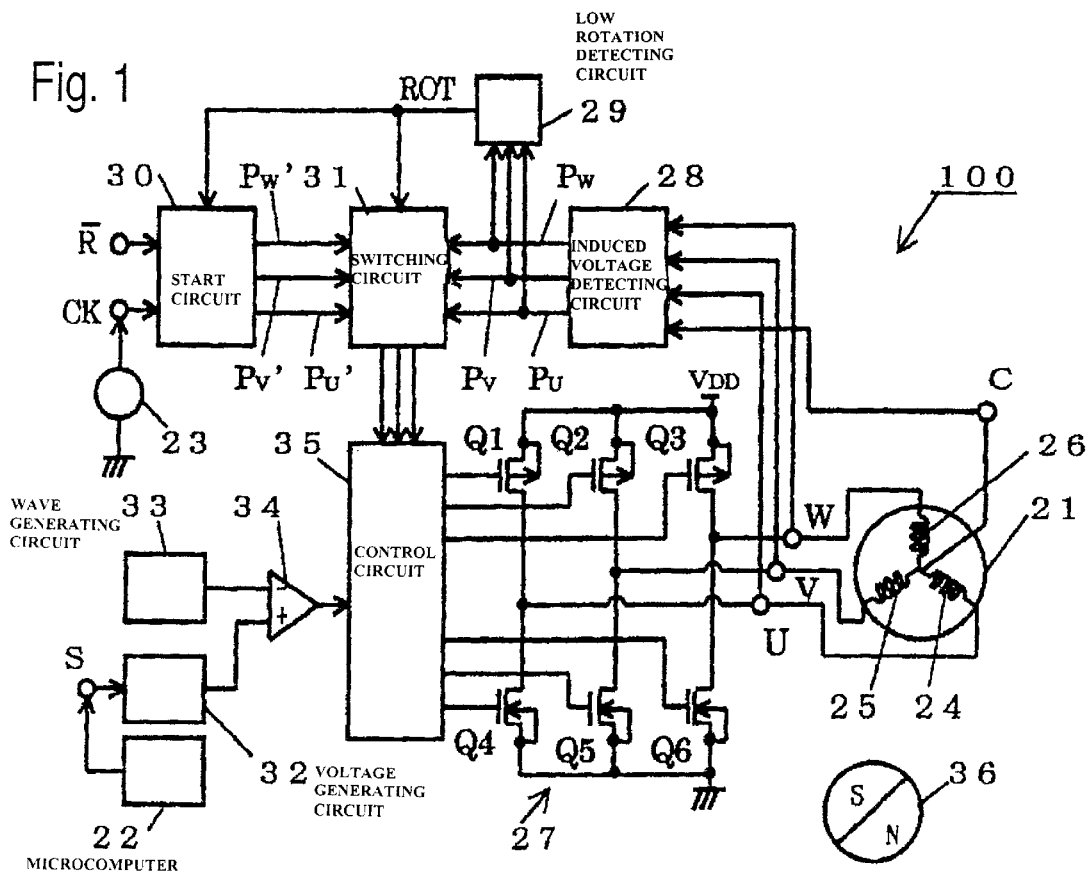
Fig. 1
Fig. 2A Conduction Timing of Exciting Coil
| HIGH SIDE | V | U | W | V | U | W | V |
|---|---|---|---|---|---|---|---|
| LOW SIDE | W | V | U | W | V | U | W |
Fig. 2B Control Timing of Transistor
| HIGH SIDE | Q2 | Q1 | Q3 | Q2 | Q1 | Q3 | Q2 |
|---|---|---|---|---|---|---|---|
| LOW SIDE | Q6 | Q5 | Q4 | Q6 | Q5 | Q4 | Q6 |
Fig. 2C Waveform of Detection Signal
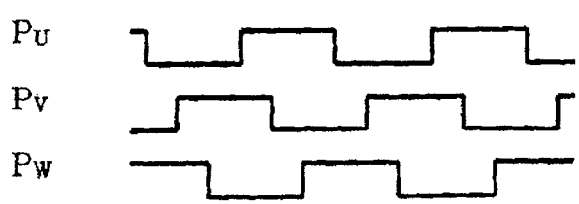

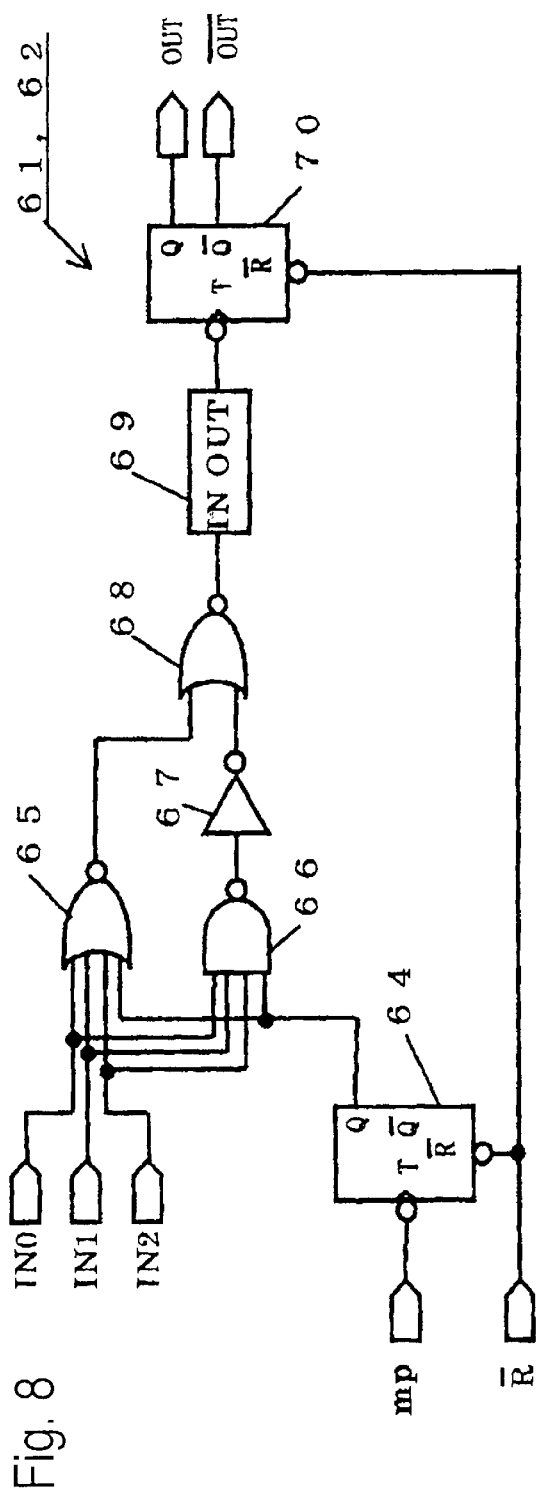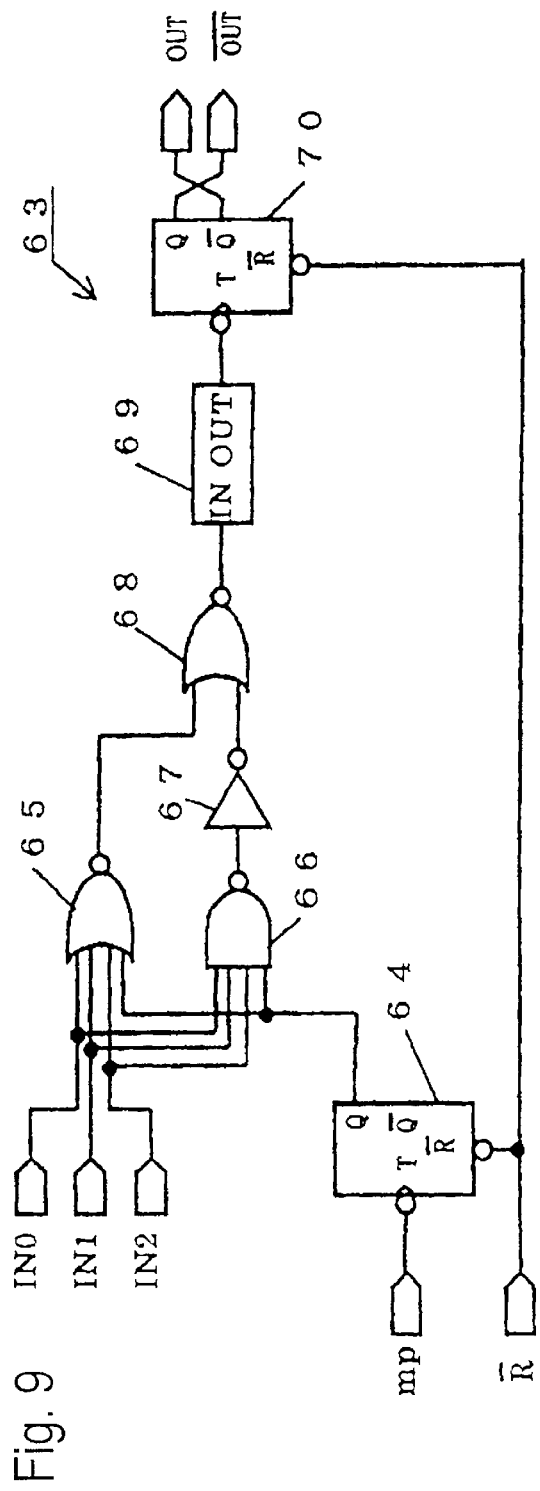
Fig. 8
Fig. 9

Fig. 10 (a) Input of Start Pattern Generating Circuit (b) First Output Circuit

Fig. 11 (a) Input of Start Pattern Generating Circuit
(b) Second Output Circuit

Fig. 12 (a) Input of Start Pattern Generating Circuit (b) Third Output Circuit

Fig. 13
(a) Starting Circuit Input
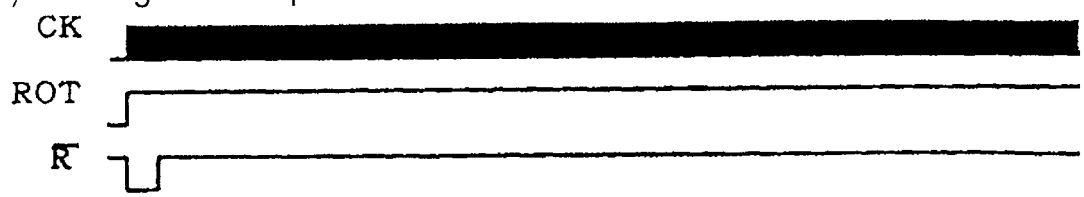
(b) Start Pattern
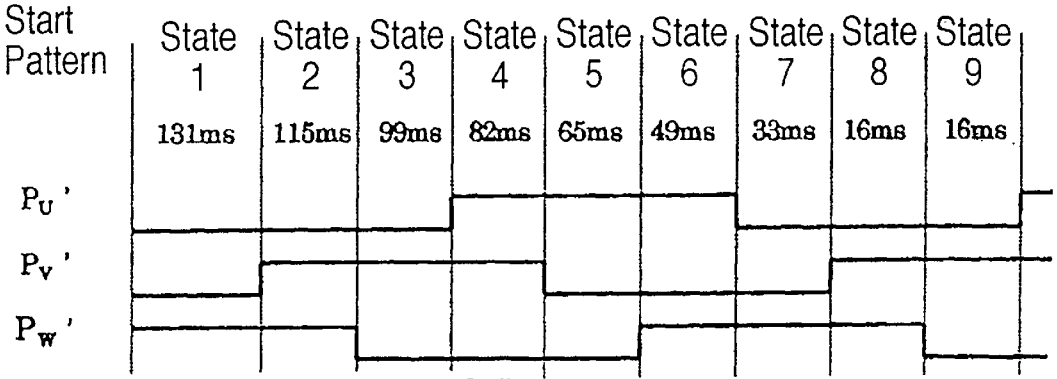
(c) Conduction Timing of Armature Coil
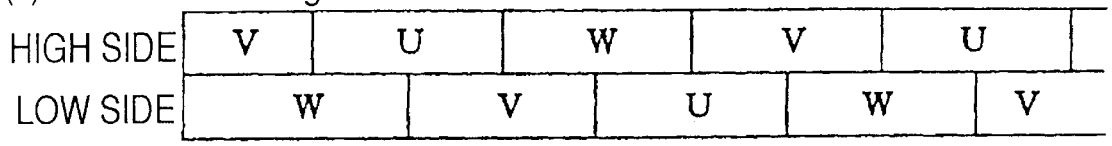
(d) Control Timing of Transistor
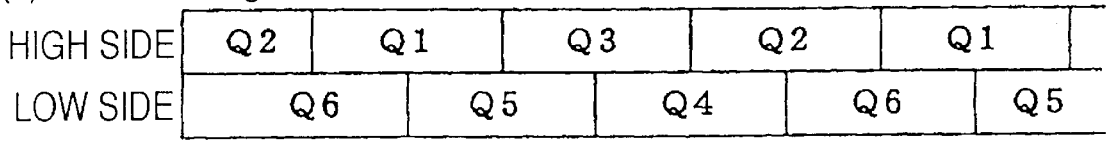
(e) Rotor Position
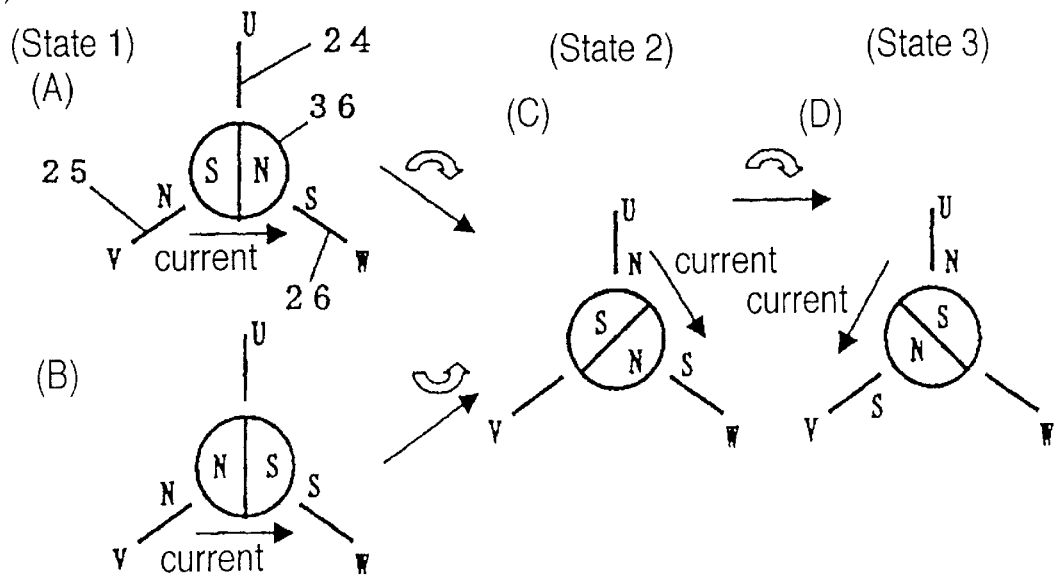

BRUSHLESS MOTOR DRIVING DEVICE

BACKGROUND OF THE INVENTION

The present invention relates to a brushless motor driving device of the sensorless type so configured to detect a rotor position fry use of an induced voltage generated across an armature coil.

In the brushless motor driving device of the sensorless type, when a rotor is in a stationary condition, since no induced voltage generates across an armature coil, it is not possible to detect a rotor position. Therefore, when the motor is started, it becomes necessary to forcibly give a rotating magnetic field from the outside at the time of starting the motor. A brushless motor driving device having a means for this purpose is proposed in for example Japanese Patent Application Pre examination Publication No. JP-A-57-173385.

Now, the brushless motor driving device disclosed in JP-A-57-173385 will be described with reference to FIG. 14. In the drawing, a power supply 1 is connected through a power switch 2 to each of a U-phase coil, a V-phase coil and a W-phase coil of armature coils 3 of a three-phase brushless motor and to a fixed timer circuit 4. The armature coils 3 are located to surround a rotor 10. The U-phase coil, the V-phase coil and the W-phase coil of the armature coils 3 are connected to a collector of transistors TR1, TR2 and TR3, respectively, which are included in a driver circuit 9. An emitter of these transistors TR1, TR2 and TR3 are connected to ground. An output S1 of the fixed timer circuit 4 is connected to a switching timer circuit 5 and a rotating magnetic field generating circuit 6, and an output S2 of the switching timer circuit 5 is connected to a switch circuit 7 for controlling the switch circuit 7. An induced voltage detecting circuit 8 has inputs connected to the U-phase coil, the V-phase coil and the W-phase coil of the armature coils 3, respectively, for detecting an induced voltage generated on the respective phase coils of the armature coils 3. This switch circuit 7 receives, from the rotating magnetic field generating circuit 6, currents S3, S4 and S5 for driving the driver circuit 9. The switch circuit 7 also receives, from the induced voltage detecting circuit 8, a drive current based on the induced voltage detected from the respective phase coils of the armature coils 3. The switch circuit 7 is controlled by the switching timer circuit 5 to select one of the received drive currents so as to supply the selected drive current to the driver circuit 9. Three output terminals of the switch circuit 7 are connected to a base of the transistors TR1, TR2 and TR 3, respectively.

With this arrangement, when the power switch 2 is turned on, one end of each of the U-phase coil, the V-phase coil and the W-phase coil of the armature coils 3, is connected the power supply 1. Simultaneously, the fixed timer circuit 4 operates to generate the control signal S1 having a constant time width shown at (a) in FIG. 15 for exciting one phase coil of the armature coils 3, for example, the W-phase coil. This control signal S1 is supplied to the rotating field generating circuit 6, and at the same time, to the switching timer circuit 5. When a constant time elapses after the control signal S1 is outputted from the fixed timer circuit 4, the fixed timer circuit 4 is brought into an off condition. Thus, the rotating magnetic field venerating circuit 6 generates the drive signals S3, S4 and S5 as shown at (c), (d) and (e) in FIG. 15, respectively, for exciting the U-phase coil, the V-phase coil and the W-phase coil of the armature coils 3. The drive signals S3, S4 and S5 are supplied through the switch circuit 7 S to the base of the transistors TR1, TR2 and TR3, respectively. The switch circuit 7 is controlled by the switching signal S2 at (b) in FIG. 15 outputted from the switching timer circuit 5, so that switches in the switch circuit 7 are putted in a connection condition shown in FIG. 14. This connection condition is maintained until the switching signal S2 is brought into a low level.

The drive signals S3, S4 and S5 generated in the rotating magnetic field generating circuit 6 are sequentially supplied to the base of the transistors TR1, TR2 and TR3, respectively, so that an electric current supplied from the power supply 1 sequentially flows in the U-phase coil, the V-phase coil and the W-phase coil of the armature coils 3, respectively, with the result that a rotating magnetic field is generated in the armature coils 3 so that the rotator starts to rotate. Thus, if use motor is started and if the predetermined time has elapsed, the switching signal S2 outputted from the switching timer circuit 5 is brought into the low level, so that the connection condition of the switch circuit 7 is changed from a condition opposite to the connection condition shown in FIG. 14. As a result, the drive signals outputted from the induced voltage detecting circuit 8 by detecting an induced voltage generated an the respective phase coils of the armature coils 3, are supplied through the switch circuit 7 to the drive circuit 9 so as to sequentially drive the transistors TR1, TR2 and TR3, whereby rotation of the three-phase brushless motor is maintained.

However, since the drive signals generated by the rotating magnetic field generating circuit 6 have a constant pulse width, when the motor is started, a phase exciting time becomes constant, so that a time required for starting becomes long, or alternatively, the motor cannot he started smoothly. Furthermore, the phase exciting time and the operating time of the fixed timer circuit 4 are fixed and therefore, cannot be changed arbitrarily.

BRIEF SUMMARY OF THE INVENTION

Accordingly, it is an object of the present invention to provide to brushless motor driving device which has overcome the above mentioned problems of the prior art.

Another object of the present invention is to provide a brushless motor driving device capable of shortening the starting time and also of smoothly starting the motor.

Still another object of the present invention is to provide a brushless motor driving device capable of arbitrarily setting the exciting time at the time of starting the motor.

The above and other objects of the present invention are achieved in accordance with the present invention by a brushless motor driving device so configured to control excitation of each phase armature coil on the basis of starting patterns supplied from a start circuit in a starting operation and a rotator position signal obtained from an induced voltage generated between opposite ends of each phase armature coil after completion of the starting operation, thereby to rotate a rotator, wherein the start circuit includes a main counter generates a pulse at each time the main counter counts a clock signal to a variable full count value, a sub counter counts the pulse generated by the main counter, the variable full count value being subtracted by a count value of the sub counter, and a start pattern generating circuit generating starting pattern in response to the pulse generated by the main counter.

In an embodiment of the brushless motor driving device, the sub counter is of m bits and the main counter is of n bits where m<n, and only m MSB bits of the full count value in the main counter is variable.

Specifically, the main counter includes n flipflops connected to constitute a counter of n bits, a plurality of AND circuits each receiving an output of different flipflops of the n flipflops, and a plurality of selector circuits connected between an output of selected flipflops of the n flipflops and the AND circuits, and the sub counter includes m flipflops connected to constitute a counter of m bits. Each of the selector circuits receives a corresponding one bit of the m MSB bit, of the main counter and a fixed logical level and is controlled by a corresponding one of the m bits of the sub counter to output the corresponding one bit of the in MSB bits of the main counter when the corresponding one of the m bits of the sub counter is at a first logic level and the fixed logical level when the corresponding one of the m bits of the sub counter is at a second logic level.

The brushless motor driving device can further includes a low rotation detecting circuit for detecting that a rotation speed of the rotor does not reach a predetermined value, and a switch circuit controlled by a low rotation detection signal outputted from the low rotation detecting circuit to switch from the starting pattern to the rotor position signal when the rotation speed of the rotor reaches the predetermined value.

The above and other objects, features and advantages of the present invention will be apparent from the following description of preferred embodiments of the invention with reference to the accompanying drawings.

BRIEF DESCRIPTION OF THE DRAWINGS

FIG. 1 is a block diagram of an embodiment of the brushless motor driving device in accordance with the present invention in the form of a semiconductor integrated circuit;

FIGS. 2A, 2B and 2C are timing charts for illustrating an operation of the semiconductor integrated circuit shown in FIG. 1;

FIG. 8 is a circuit diagram of the first output circuit and the second output circuit incorporated in the three-phase starting pattern generating circuit shown in FIG. 7;

FIG. 9 is a circuit diagram of the third output circuit incorporated in the three-phase starting pattern generating circuit shown in FIG. 7;

FIG. 13 is a timing chart for illustrating an operation of the semiconductor integrated circuit shown in FIG. 1 at a starting time;

DETAILED DESCRIPTION OF THE INVENTION

Figure 3:
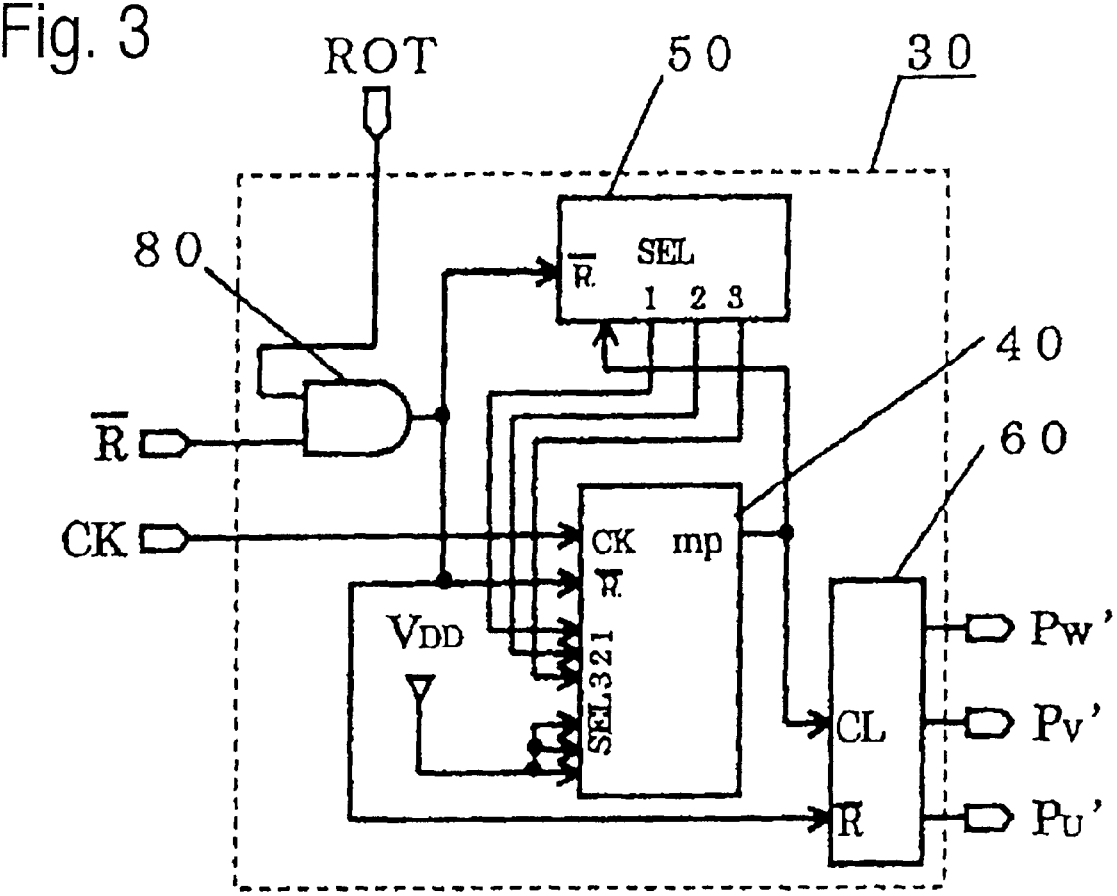
FIG. 3 is a block diagram of the starting circuit incorporated in the semiconductor integrated circuit shown in FIG. 1.

Now, an embodiment of the brushless motor driving device in accordance with the present invention will he described with reference to FIG. 1. A motor driving semiconductor integrated circuit, generally designated with the reference number 100, includes a star-connected three-phase brushless motor 21, a microcomputer 22 for supplying a rotation speed control signal for the motor 21, an oscillator 23 for generating a reference clock signal CK, and a DC power supply VDD.

Armature coils 24, 25 and 26 of the motor 21 are star-connected as a U-phase coil, a V-phase coil and a W-phase coil, and one end of the armature coils 24, 25 and 26 are connected to a U-phase terminal U, a V-phase terminal V and a W-phase terminal W, respectively. The other end of the armature coils 24, 25 and 26 is connected in common to a neutral terminal C. The armature coils 24, 25 and 26 are located to surround a rotor 36. An output of the microcomputer 22 is connected to an input terminal S.

The semiconductor integrated circuit 100 includes a output bridge circuit 27 for supplying, phase excitation currents having the current amount controlled by a PWM control, to the armature coils 24, 25 and 26 at respective predetermined timings. The semiconductor integrated circuit 100 also includes an induced voltage detecting circuit 28 detecting an induced voltage generated between opposite ends of each armature coil 24, 25 and 26, for generating a rotor position signal $P_U$, $P_V$ and $P_W$ in the form of a pulse having a half period (π radian) from a zero-crossing point where the polarity of the included voltage reverses to a next zero-crossing point where the polarity of the induced voltage reverses again.

Further, the semiconductor integrated circuit 100 includes a low rotation-detecting circuit 29 receiving the rotor position signals $P_U$, $P_V$ and $P_W$ for detecting that the rotation speed of the motor is not higher than a predetermined rotation speed, a start circuit 30 for generating start pattern signals $P_U'$, $P_V'$ and $P_W'$ a switching circuit 31 for selecting one of the rotor position signals $P_U$, $P_V$ and $P_W'$ and the start pattern signals $P_U'$, $P_V'$ and $P_W'$, an internal voltage generating circuit 32 receiving the rotation speed control signal from the microcomputer 22, for generating an internal voltage as a pulse width modulating voltage changing in accordance with the voltage of the rotation speed control signal, a triangular wave generating circuit 33 for generating a triangular wave, a comparator 34 for generating a PWM (pulse width modulation) signal obtained by comparing the triangular wave voltage from the triangular wave generating circuit 33 with the internal voltage generated by the internal voltage generating circuit 32, and a control circuit 35 receiving the PWM signal and one of the rotor position signals $P_U$, $P_V$ and $P_W$ and the start pattern signals $P_U'$, $P_V'$ and $P_W'$, for controlling the conduction timing of the output bridge circuit 27 in a PWM manner.

The output bridge circuit 27 includes P-channel MOS transistors Q1, Q2 and Q3 for controlling the conduction timing of the respective armature coils 24, 25 and 26, and N-channel MOS transistors Q4, Q5 and Q6 for PWM-controlling the amount of cogent to the armature coils 24. 25 and 26, at predetermined timings, respectively. Conduction timing signals are supplied to a gate of the P-channel MOS transistors Q1, Q2 and Q3 from the control circuit 35, respectively, and current amount control signals are supplied to a gate of the N-channel MOS transistors Q4, Q5 and Q6 from the control circuit 35, respectively. The transistors Q1 and Q4 the transistors Q2 and Q5, and the transistors Q3 and Q5 are connected in series. A source of the transistors Q1, Q2 and Q3 are connected in common to the power supply VDD, and a source of the transistors Q4, Q5 and Q6 are connected in common to ground. A connection node between the transistors Q1 and Q4, a connection node between the transistors Q2 and Q5 and a connection node between the transistors Q3 and Q6 are connected to the terminals U, V and W of the motor 21, respectively.

The induced voltage detecting circuit 28 detects at the terminals U, V and W of the motor 21, the induced voltage generated between the opposite ends of the respective armature coils 24, 25 and 26, for generating, by action of an internal integrator circuit and a comparator (both of which are not shown), the rotor position signals $P_U$, $P_V$ and $P_W$ in the form of a pulse having the half period ($\pi$ radian) from a zero crossing point where the polarity of the induced voltage reverses to a next zero-crossing point where the polarity of the induced voltage reverses again.

The low rotation detecting circuit 29 detects the rotation speed of the rotor 36 from the rotor position signals $P_U$, $P_V$ and $P_W$, for generating a low rotation detection signal ROT which assumes a high level when the rotation speed is not higher than the predetermined rotation speed, and a low level when the rotation speed is higher than the predetermined rotation speed. The low rotation detection signal ROT is supplied to the start circuit 30 and the switching circuit 31.

The start circuit 30, which will he described in detail later, receives the clock signal CK from the oscillator 23, the low rotation detection signal ROT from the low rotation detecting circuit 29, and a reset signal /R from an external. During a period in which the low rotation detection signal ROT is at the high level, the start circuit 30 supplies the start pattern signals $P_U'$, $P_V'$ and $P_W'$ through the switching circuit 31 to the control circuit 35.

The control circuit 35 receives the PWM signal from the comparator 34 and either the start pattern signals $P_U'$, $P_V'$ and $P_W'$ or the rotor position signals $P_U$, $P_V$ and $P_W$ front the switching circuit 31. The control circuit 35 generates conduction timing signals for setting the conduction timing of the armature coils 24, 25 and 26, to the gate of the MOS transistors Q1, Q2 and Q3, respectively. The control circuit 35 also generates current amount control signals to the gate of the MOS transistors Q4, Q5 and Q6, respectively.

Now, an operation will be described when the above mentioned semiconductor integrated circuit 100 to the motor 21. When the motor is to be started, the rotor 36 is in a stop condition, and no induced voltage is generated between the opposite ends of the armature coils 24, 25 and 26. Therefore, the low rotation detection signal ROT of the high level is supplied from the low rotation detecting circuit 29 to the switching circuit 31 so that the control circuit 35 controls the rotation of the rotor 35 on the basis of the start pattern signals $P_U$, $P_V'$, and $P_W'$ from the start circuit 30.

If the rotor starts to rotate, the induced voltage generated between the opposite ends of the armature coils 24, 25 and 26 are supplied from the terminals U, V and W to the induced voltage detecting circuit 28, so that the rotor position signals $P_U$, $P_V'$, and $P_W$ are generated by action of the not-shown internal integrator circuit and the not-shown internal comparator circuit, and are supplied to the low rotation detecting circuit 29. If the rotation speed of the rotor is not higher than the predetermined rotation speed, the low rotation detection signal ROT of the high level continues to be supplied from the low rotation detecting circuit 29 to the switching circuit 31, so that the control circuit 35 continues to control the rotation of the rotor 35 on the basis of the start pattern signals $P_U'$, $P_V'$ and $P_W'$ from the start circuit 30. However, if the rotation speed of the rotor is becomes higher than the predetermined rotation speed, the low rotation detection signal ROT of the low level is supplied from the low rotation detecting circuit 29 to the switching circuit 31 so that the control circuit 35 controls the rotation of the rotor 35 on the basis of the rotor position signals $P_U$, $P_V$ and $P_W$.

Since the rotation control of the motor 21 based on the start pattern signals $P_U'$, $P_V'$ and $P_W'$ from the start circuit 30 will be described later, the rotation control of the motor 21 based on the rotor position signals $P_U$, $P_V$ and $P_W$ from the induced voltage detecting circuit 28 will be first explained with reference to FIGS. 2A, 2B and 2C.

The induced voltages generated between the opposite ends of the armature coils 24, 25 and 26 are supplied from the terminals U, V and W to the induced voltage detecting circuit 28, and the rotor position signals $P_U$, $P_V$ and $P_W$ having waveforms as shown in FIG. 2C are generated by action of the not-shown internal integrator circuit and the not-shown internal comparator circuit, and are supplied through the switching circuit 31 to the control circuit 35. If the rotor position signals $P_U$, $P_V$ and $P_W$ are supplied to the control circuit 35, the control circuit 35, sets the conduction timing on the basis of the rotor position signals $P_U$, $P_V$ and $P_W$.

On the other hand, if the rotation speed control signal is supplied from the microcomputer 22 to the internal voltage generating circuit 32 the internal voltage generating circuit 32 generates the internal voltage as the pulse width modulating voltage changing in accordance with the voltage of the rotation spied control signal. This internal voltage is applied to a non-inverted input (+) of the comparator 35, and is compared with the triangular wave supplied to an inverted input (−) of the comparator 34 from the triangular wave generating circuit 33. The comparator 34 generates the PWM signal for a current control to realize a desired rotation speed set in the microcomputer 22. Incidentally, the rotation speed control signal supplied from the microcomputer 22 is generated from a difference voltage obtained by supplying the microcomputer 22 with a rotation speed signal which is generated in an not-shown internal circuit on the basis of the rotator position signal supplied from the induced voltage detecting circuit 24 and by comparing the rotation speed signal with a desired rotation speed signal set in the microcomputer 22.

If the rotor position signals $P_U$, $P_V$ and $P_W$ are supplied to the control circuit 35 from the induced voltage detecting circuit 28 and at the PWM signal is supplied to the control circuit 35 from the comparator 34, the conduction timings for the output bridge circuit 27 are set, and the conduction timing control signals and the current amount control signals for controlling the output bride circuit 27 are generated at the conduction timings thus set. Thus, the conduction timing control signals are supplied to the gate of the MOS transistors Q1, Q2 and Q3 is the output bridge circuit 27, and the current amount control signals are supplied to the gate of the MOS transistors Q4, Q5 and Q6, so that the conduction timing of the transistors Q1, Q2, Q3, Q4 Q5 and Q6 are controlled in the sequence shown in FIG. 2B. In the motor 21, an electric current flows in each two phase armature coils composed of a phase armature coil connected at a high side and a phase armature coil connected at a low side, in the direction of the phase order shown in FIG. 2A, so that each two phase armature coils are excited and the rotor 36 is rotated. The current direction is changed in the order of the terminal V to W, U to W, U to V, W to V, W to U and V to U so that six conditions are alternatively repeated.

Now, a detail of the start circuit 30 will be described with reference to FIG. 3. The start 30 includes a main counter 40 of n bits, for example, 17 bits and a sub counter 50 of m bits, for example, 3 bits. The start 30 also includes a three-phase start pattern generating circuit 60 and a two-input AND circuit 80. The main counter 40 has a clock input receiving the clock signal CK from the oscillator 23 and a reset input receiving an output of the AND circuit 80 receiving the low rotation detection signal RUT and the reset signal /R. The main counter 40 receives selection signals SEL1, SEL2 and SEL3 from the sub counter 50. The sub counter 50 has a reset input receiving the output of the AND circuit 80, and also receives an output "mp" of the main counter 40. The three-phase start pattern generating circuit 60 receives the output of the AND circuit 80 and the output "mp" of the main counter 40.

Figure 4:
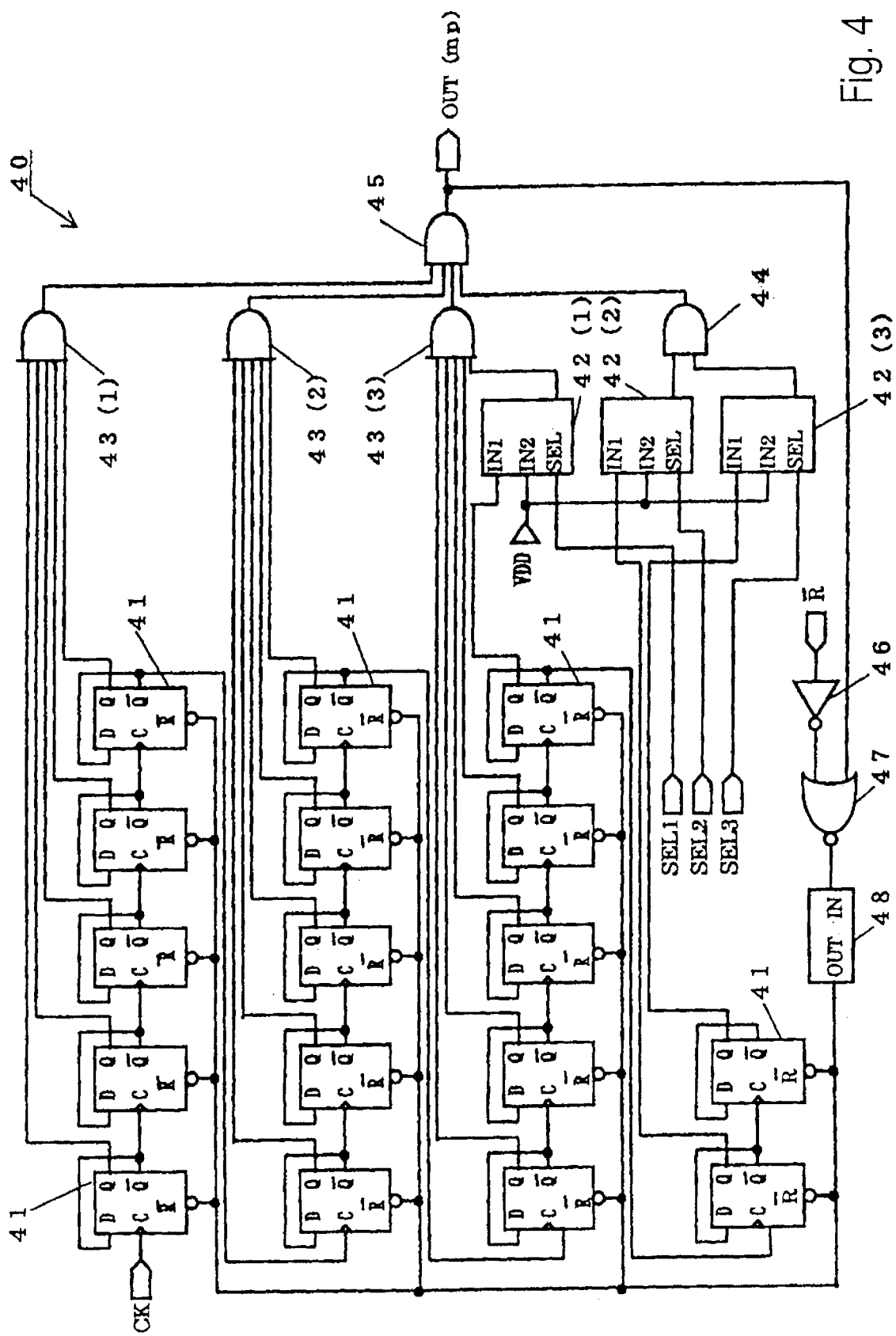
FIG. 4 is a circuit diagram of the main counter of the starting circuit shown in FIG. 3.

Referring to FIG. 4, there is shown a circuit diagram illustrating a detailed construction of the main counter 40. The main counter 40 includes 17 D-type flipflops 41, three selector circuit, 42, three 5-input AND circuit 43, a 4-input AND circuit 45, a NOT circuit 46, a 2-input NOR circuit 47 and a delay circuit 48. Each D-type flipflops 41 is so connected in the form of a T-type flipflop to fetch at a rising edge (positive edge), and the 17 D-type flipflops 41 are connected to constitute an addition counter. A first stage of the 17 D-type flipflops 41 receives the clock signal CK. Q output of the first to fifth stages of the 17 D-type flipflops 41 are connected to five inputs of the 5-input AND circuit 43(1) respectively, and Q output of the sixth to tenth stages of the 17 D-type flipflops 41 are connected to five inputs of the 5-input AND circuit 43(2), respectively. Q output of the 11th to 14th stages of the 17 D-type flipflops 41 are connected to four inputs of the 5-input AND circuit 43(3), respectively. A Q output of the 15th stage flipflop is connected to an input IN1 of the selector 42(1), and a Q output of the 16th stage flipflop is connected to an input IN1 of the selector 42(2). A Q output of the 17th stage flipflop is connected to gate input IN1 of the selector 42(3).

Each of the selector circuits 42 has an input IN2 connected to the power supply voltage VDD. A selection terminal SEL of the selector circuit 42(1) is connected to receive the selection signal SEL1 from the sub counter 50. A selection terminal SEL of the selector circuit 42(2) is connected to receive the selection signal SEL2 from the sub counter 50. A selection terminal SEL of the selector circuit 42(3) is connected to receive the selection signal SEL3 from the sub counter 50. An output of the selector circuit 42(1) is connected to the remaining input of the input AND circuit 43(3). An output of the selector circuits 42(2) and 42(3) are connected to the 2-input AND circuit 44.

These selector circuits 42 are so configured to select the input IN1 when the selection terminal SEL is at the low level, and the input IN2, namely, the power supply voltage VDD, when the selection terminal SEL is at the high level. The 4-input AND circuit 45 receives an output of the 5-input AND circuits 43 and the 2-input AND circuit 44. Air output of the 4-input AND circuit 45 constitutes the output of the main counter 40, and is connected to one input of the 2-input NOR circuit 47 having the other input connected an output of the NOT circuit 47 receiving the reset signal /R. An output of the 2-input NOR circuit 47 is connected to an input of the delay circuit 48 having an output connected to a recast input /R of each flipflop 41.

Figure 5:
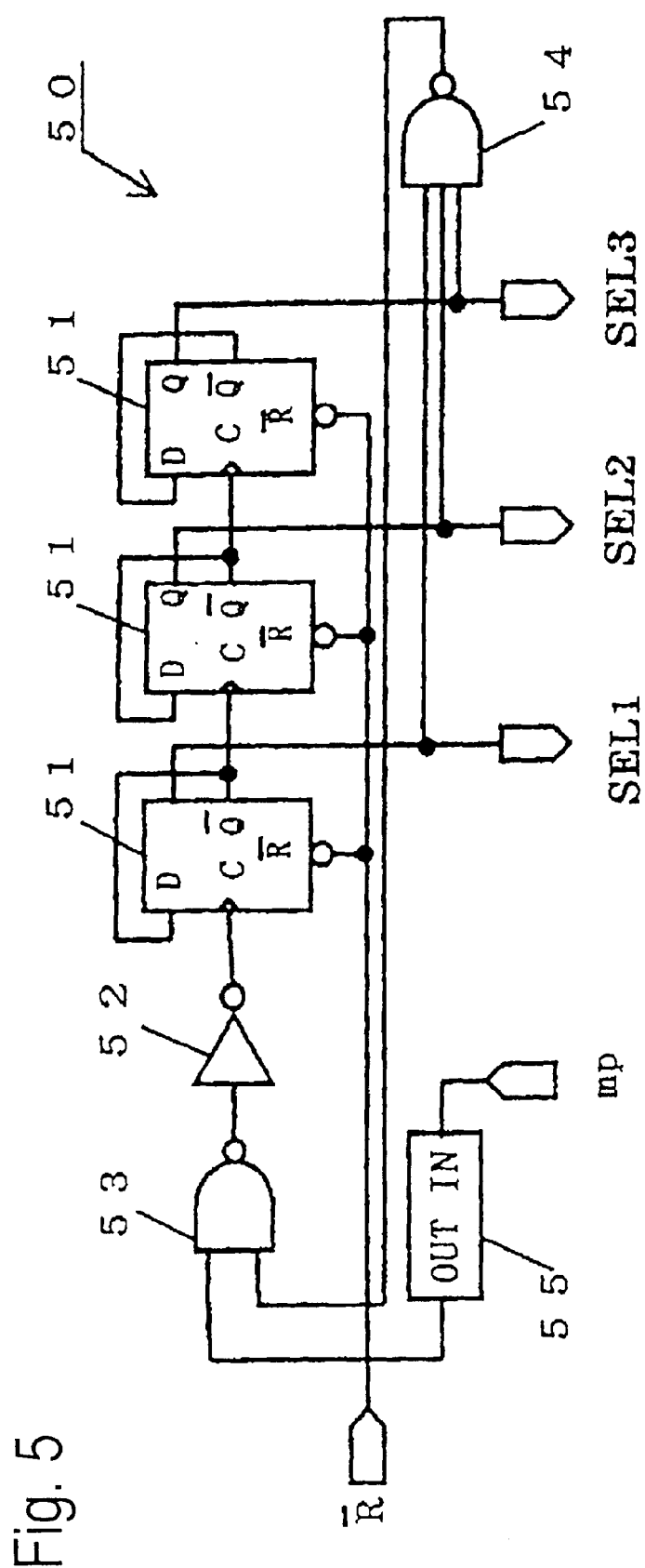
FIG. 5 is a circuit diagram of the sub counter of the starting circuit shown in FIG. 3.

Referring to FIG. 5, there is shown a circuit diagram illustrating a specific structure of the sub counter 50. The sub counter 50 includes three D-type flipflops 51, a NOT circuit 52, a 2-input NAND circuit 53, a 3-input NAND circuit 54, and a one-shot circuit 55. Each D-type flipflop is connected in the form of a T-type flipflop to fetch at a rising edge and the three D-type flipflops 51 are connected to constitute an addition counter. A first stage of the three D-type flipflop 51 is connected to an output of the NOT circuit 52 having an input connected to an output of the 2-input NAND circuit 53. A Q output of the first stage flipflop constitutes the selection signal SEL1 for the main counter 40, and a Q output of the second stage flipflop constitutes the selection signal SEL2 for the main counter 40. A Q output of the third stage flipflop constitute the selection signal SEL3 for the main counter 40. The Q output of the three flipflops 51 are connected to the 3-input NAND circuit 54, and a reset input /R of each flipflops 51 is connected to receive the reset signal /R. One input of the 2-input NAND circuit 53 is connected to an output of the one shot circuit 55, and the other input of the 2-input NAND circuit 53 is connected to an output of the 3-input NAND circuit 54. The one shot circuit 55 receives the output of the maid counter 40 to generate one shot pulse at a falling edge of the output of the main counter 40.

Figure 6:
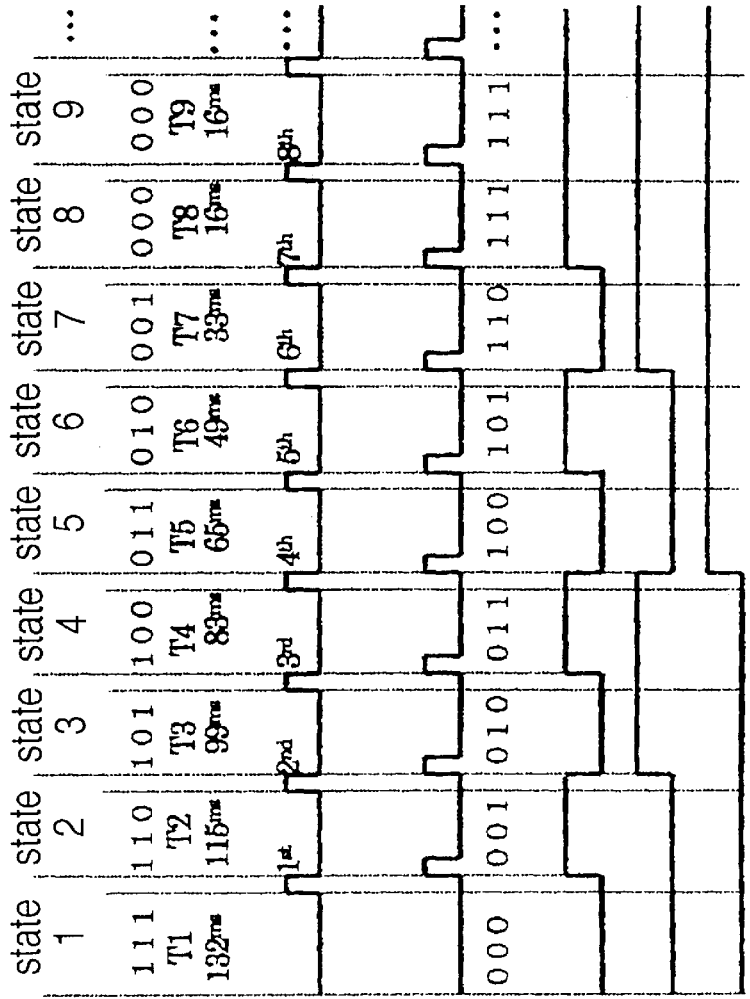
FIG. 6 is a timing chart illustrating an operation of the main counter and the sub counter shown in FIGS. 4 and 5.

Now, an operation of the main counter 40 and the sub counter 50 will be explained with reference to FIG. 6.

State 1

If it starts to drive the motor, the clock signal CK of for example 1 MHz (period=1 $\mu$s) froze the oscillator 23 to the main counter 40, and the low rotation detection signal ROT of the high level is supplied from the low rotation detecting circuit 29 to one input of the 2-input AND circuit 80. On the other hand, the reset signal /R of the low level is applied to the other input of the 2-input AND circuit 80. Therefore a low level signal is outputted from the 2-input AND circuit 80 to reset each of the flipflops 41 and 51 of the main counter 40 and the sub counter 50. Thus, the main counter 40 and the sub counter 50 are reset, and the State 1 is set.

At this time, the Q output of the flipflops 51 in the sub counter 50 are all at the low level, so that the selection signals SEL1, SEL2 and SEL3 of the low level are supplied to the main counter 40, and on the other hand, the output of the 3-input NAND circuit 54, namely, the ether input of the 2-input NAND circuit 53 is of the high level. Therefore, each of the selector circuits 42 selects the Input IN1, so that the Q output of the 15th to 17th flipflops 41 are outputted from the selector circuits 42 to the one input of the 5-input AND circuit 43(3) and the two inputs of the 2-input AND circuit 44, respectively. Thus, the full count number of the 3 MSB bits of the 17 bits is set to "111". In this condition, if the clock signal CK is supplied to the first stage flipflop 41, the main counter 40 starts to count the clock signal CK and counts up until the Q output of all the D-type flipflops 41 are brought to the high level. Namely, the main counter 40 counts until a full count of 17 bits, namely, until a time T1 =1 $\mu s \times 2^{17}$=132 ms has elapsed.

State 2

When the time T1=132 ms has elapsed, the Q output of all the D-type flipflops 41 are brought to the high level, the output of all the AND circuits 43, 44, 45 becomes the high level. The output of the AND circuit 45 outputs a first pulse "mp" as the output of the main counter 40, and is supplied to the input of the 2-input NOR circuit 47. The pulse "mp"

supplied to the 2-input NOR circuit 47 is delayed by the delay circuit 48, and then, the reset signal /R of the low level is supplied to the reset input of all the D-type flipflops 41, so that all the D-type flipflops 41 are reset, and therefore, the count value of the main counter 40 is reset, and the State 2 is set in the main counter 40.

The pulse "mp" outputted from the main counter 40 is supplied to the one shot circuit 55 in the sub counter 50, and the one-shot pulse "op" in synchronism with the falling of the pulse "mp" is supplied to one input of the 2-input NAND circuit 53 so that the sub counter 50 counts the one-shot pulse "op". Accordingly, if the first pulse "mp" is supplied, the count value of the sub counter 50 becomes "001". Namely, the Q output of the first stage flipflop 51 becomes a high level, and the Q output of the second and third stage flipflops 51 are maintained at the low level. Thus, the selection signals SEL1, SEL2 and SEL3 of the high level, the low level and the low level are supplied to the main counter 40. At this time, the output of the 3-input NAND circuit 54 is maintained at the high level.

Accordingly, in the main counter 40, the selector circuit 42(1) selects the input IN2, and the selector circuits 42(2) and 42(3) select the input IN1. Therefore, the selector circuit 41(1) outputs the powder supply voltage VDD, namely, the high level signal, in place of the output of the 15th stage flipflop 41, to the input of the 5-input AND circuit 43(3). On the other hand, the output of the 16th and 17th stage flipflops 41 are supplied through the selector circuits 42(2) and 42(3) to the 2-input AND circuit 44, Thus, the full count value of the 3 MSB bits of the 17 bits is changed to "110".

In this State 2, if the clock signal CK is supplied to the first stage flipflop 41, the main counter 40 starts to count the clock signal CK and counts until the Q output of the D-type flipflops 41 other than the is 15th stage flipflop are brought to the high level. Namely, the main counter 40 counts until a time T2=1 $\mu s \times (2^{17} - 2^{14}) = (132-16)$ ms=115 ms has elapsed.

State 3

When the time T1=115 ms has elapsed, the Q output of all the D-type flipflops 41 other than the 15th stage flipflop are brought to the high level, the output of all the AND circuits 43, 44, 45 becomes the high level. The output of the AND circuit 45 outputs a second pure "mp" as the output of the main counter 40, and is supplied to the input of the 2-input NOR circuit 47. Similarly in the State 2, if the pulse "mp" is supplied to the 2-input NOR circuit 47, the count value of the main counter 40 is reset, and the State 3 is set in the main counter 40.

Similarly to the State 2, the pulse "mp" outputted from the main counter 40 is supplied to the one shot circuit 55 in the sub counter 50, and the sub counter 50 counts the one-shot pulse "op" outputted from the one shot circuit 55. Accordingly, if the second pulse "mp" is supplied, the count value of the sub counter 50 becomes "010". Namely, the Q output of the second stage flipflop 51 becomes a high level, and the Q output of the first and third stage flipflops 51 become the low level. Thus, the selection signals SEL1, SEL2 and SEL3 of the low level (L), the high level (H) and the low level (L) are supplied to the main counter 40. At this time, the output of the 3-input NAND circuit 54 is maintained at the high level.

Accordingly, in the main counter 40, the selector circuit 42(2) selects the input IN2, and the selector circuits 42(1) and 42(3) select the input IN1. Therefore, the selector circuit 42(1) outputs the output of the 15th stage flipflop 41, to the input of the 5-input AND circuit 43(3). The selector circuit 42(2) outputs the power supply voltage VDD, namely, the high level signal, in place of the output of the 16th stage flipflop 41, to one input of the 2-input AND circuit 44. The output of the 17th stage flipflop 41 is supplied through the selector circuit 42(3) to the other input of the 2 input AND circuit 44. Thus, the full count value of the 3 MSB bits of the 17 bits is changed to "101".

In this State 3, if the clock signal CK is supplied to the first stage flipflop 41, the main counter 40 starts to count the clock signal CK and counts until the Q output of the D-type flipflops 41 other than the 16th stage flipflop are brought to the high level. Namely, the main counter 40 counts until a time T3=1 $\mu s \times (2^{17} - 2^{15}) = (132-33)$ ms=99 ms has elapsed.

State 4 to State 8

Similarly, the output of the AND circuit 45 outputs a third, fourth, fifth, sixth or seventh pulse "mp" as the output of the main counter 40, and is supplied to the input of the 2-input NOR circuit 47. If the third, fourth, fifth, sixth or seventh pulse "mp" is supplied to the 2-input NOR circuit 47, the count value of the main counter 40 is reset, and the State 4, the State 5, the State 6, the State 7 or the State 8 is set in the main counter 40.

If the third, fourth, fifth, sixth or seventh pulse "mp" is outputted from the main counter 40 to the sub counter 50, and the count value of the sub counter 50 becomes "011", "100", "101", "110" or "111". Thus, the selection signals SEL1, SEL2 and SEL3 of "H, H, L"; "L, L, H" "H, L, H", "L, H, H", or "H, H, H" are supplied to the main counter 40. Accordingly, the full count value of the Q MSB bits of the 17 bits are changed to "100", "011", "010", "001" or "000". At this time, when the third, fourth, fifth or sixth pulse "mp" is supplied, the output of the 3-input NAND circuit 54 is maintained at the high level, but, when the seventh pulse "mp" is supplied, the output of the 3-input NAND circuit 54 is brought into the low level. Thereafter, until the reset signal /R of the low level is supplied, the count value of the sub counter 50 is maintained at "111", even if the pulse "mp" is supplied, and therefore, the selection signals SEL1, SEL2 and SEL3 of "H, H, H" continue to be supplied to the main counter 40.

In the State 4 to the State 8, if the clock signal CK is supplied to the first stage flipflop 41, the main counter 40 starts to count the clock signal CK and counts to the full count value set as mentioned above in the respective state. Namely, in the State 4, the main counter 40 counts until a time T4=1 $\mu s \times (2^{17} - 2^{15} - 2^{14}) = (132-33 \cdot 16)$ ms=83 ms has elapsed. In the State 5, the main counter 40 counts until a time T5=1 $\mu s \times 2^{16} = 65$ ms has elapsed. In the State 6, the main counter 40 counts until a time T6=1 $\mu s \times (2^{16} - 2^{14}) = (65-16)$ ms=49 ms has elapsed. In the State 7, the main counter 40 counts until a time T7=1 $\mu s \times 2^{15} = 33$ ms has elapsed. In the State 8, the main counter 40 counts until a time T8=1 $\mu s \times 2^{14} = 16$ ms has elapsed.

State 9 and Succeeding States

When the time T8=16 ms has elapsed, the output of the 4-input AND circuit 45 outputs an eighth pulse "mp" as the output of the main counter 40, and is supplied to the input of the 2-input NOR circuit 47. If the pulse "mp" is supplied to the 2-input NOR circuit 47, the count value of the main counter 40 is reset, and the State 9 is set in the main counter 40. Thereafter, as mentioned above, until the reset signal /R of the low level is supplied, the count value of the sub counter 50 is maintained at "111", even if the pulse "mp" is supplied and therefore, the selection signals SEL1, SEL2 and SEL3 of "H, H, H" are supplied to the main counter 40, so that the 3 MSB bits of the 17 bits in the main counter 40 are not counted. Accordingly, similarly to the State 8, the main counter 40 counts up to the full count value of the 14 bits, namely, until the time T=1 µs×2$^{14}$=16 ms has elapsed.

Figure 7:
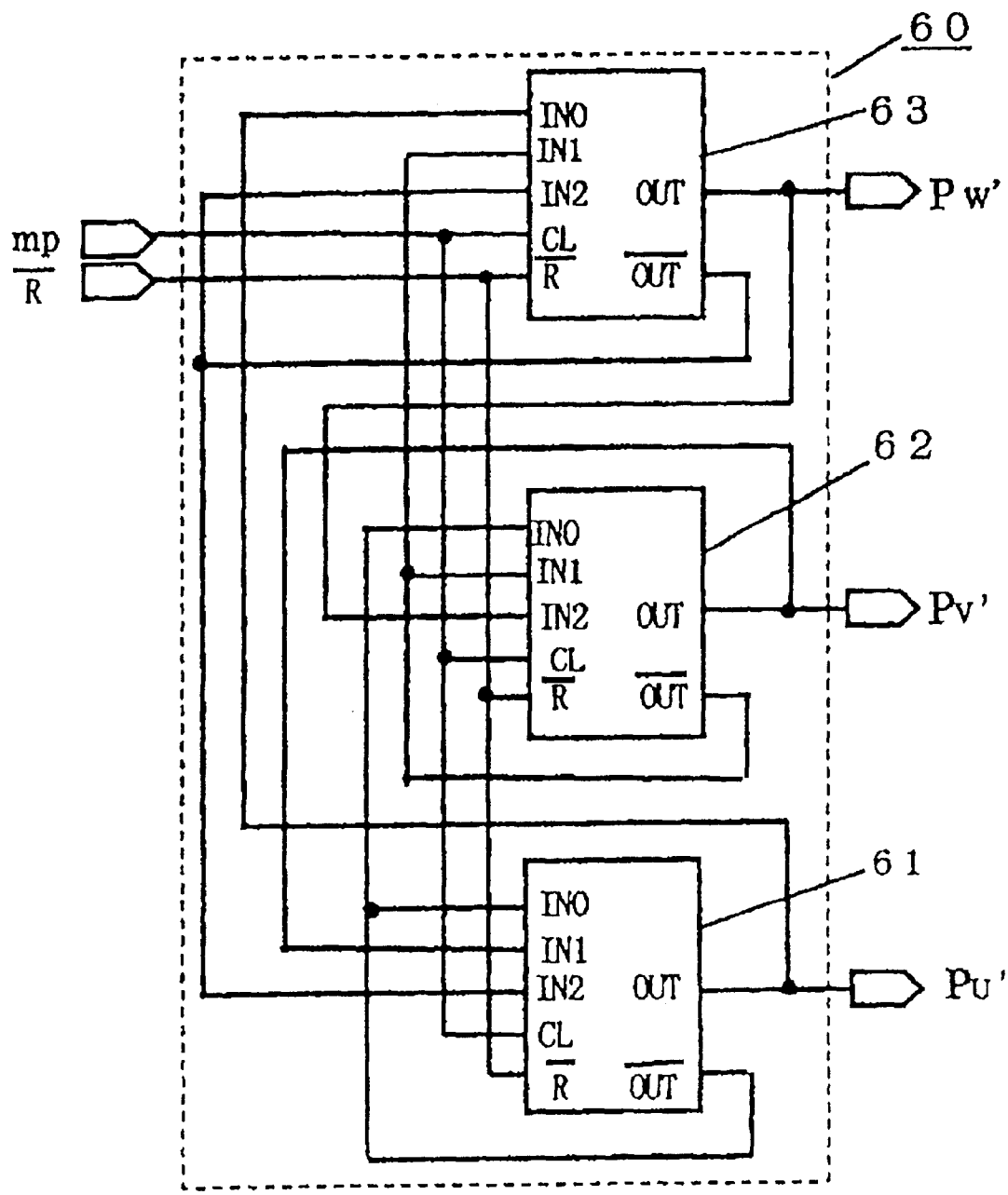
FIG. 7 is a block diagram of the three phase starting pattern generating circuit incorporated in the starting circuit shown in FIG. 3.

Referring to FIG. 7, there is shown a black diagram of the three-phase starting pattern generating circuit 60. The three-phase starting pattern generating circuit 60 includes a first output circuit 61 for generating the start pattern P$_U$', a second output circuit 62 for generating the start pattern P$_V$', and a third output circuit 63 for generating the start pattern P$_W$'. Each of the output circuits 61, 62 and 63 has inputs IN0, IN1 and IN2, a clock input CK, a reset input /R, a pair of outputs OUT and /OUT. The clock input CK is connected to receive the output "mp", and the reset input /R is connected to receive the reset signal /R. The output OUT of the first output circuit 61 outputs the start pattern P$^{U'}$, and the output OUT of the second output circuit 62 outputs the start pattern P$_V$'. The output OUT of the third output circuit 63 outputs the start pattern P$_W$'.

The input IN0 of each of the first and second output circuits is 61 and 62 is connected to the output /OUT the first output circuit 61. The input IN0 of the third output circuit 63 is connected to the output OUT of the first output circuit 61. The input IN1 of the first output circuit 61 is connected to the output OUT of the second output circuit 40. The input IN1 of each of the second and third output circuit, 61 and 63 is connected to the output /OUT of the second output circuit 62. The input IN2 of each of the first and third output circuits 61 and 63 is connected to the output /OUT of the third output circuit 63. The input IN2 of the second output circuit 62 is connected to the output OUT of the third output circuit 63.

The first and second output circuits 61 and 62 are identical. As shown in FIG. 8 showing a detail construction of the first output circuit and the second output circuit, each of the first and second output circuits includes a T-type flipflop 64 for fetching the falling edge (negative edge) of the output "mp" of the main counter 40, a 4-input NOR circuit 65 receiving the inputs IN0, IN1 and IN2 and a Q output of the T-type flipflop 64, a 4-input NAND circuit 66 receiving the inputs IN0, IN1 and IN2 and the Q output of the T-type flipflop 64, a NOT circuit 67 receiving an output of the 4-input NAND circuit 66, a 5-input NOR circuit 68 receiving an output of the 4-input NOR circuit 65 and an output of the NOT circuit 67, a one-shot circuit 69 for generating one shot pulse at a falling edge of an output of the 2-input NOR circuit Q and another T-type flipflop 70 for fetching the falling edge of the one shot pulse outputted from the one-shot circuit 69. A Q output of the T-type flipflop 70 constitutes the output OUT, and a /output of the T-type flipflop 70 constitutes the output /OUT.

The third output circuit 63 has a structure as shown in FIG. 9 which is a circuit diagram illustrating a detailed construction of the third output circuit. Similarly to the first and second output circuits 61 and 62 shown in FIG. 8, the third output circuit 63 includes the T-type flipflop 35 the 4-input NOR circuit 65, the 5-input NAND circuit fib, the NOT circuit 67, the 2-input NOR circuit 68, the one-shot circuit 69 and the T-type flipflop 70. However, the Q output of the T-type flipflop 70 constitutes the output /OUT, and the output of the T-type flipflop 70 constitutes the output OUT.

Figure 10:
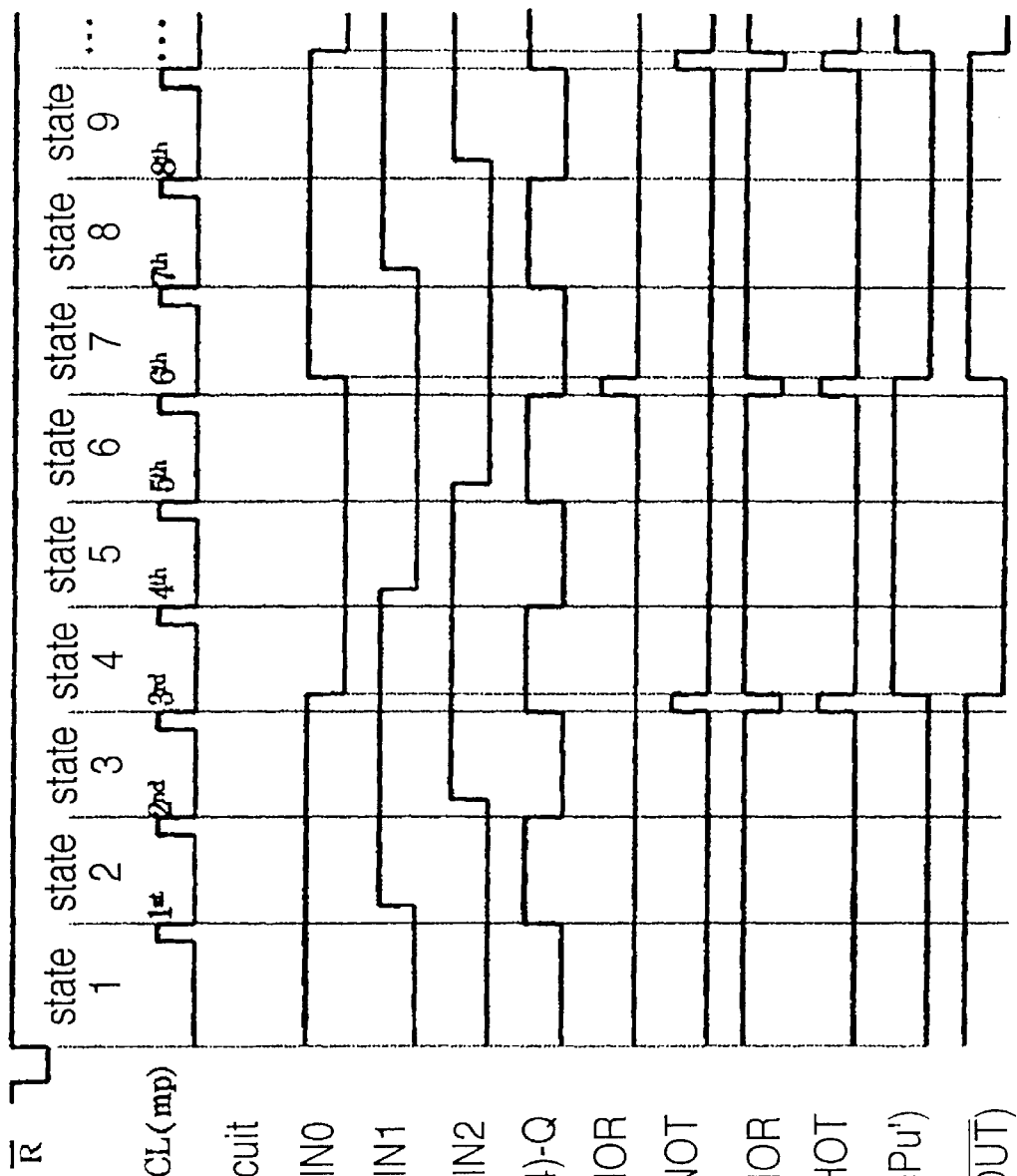
FIG. 10 is a timing chart illustrating an operation of the first output circuit shown in FIG. 8.
Figure 11:
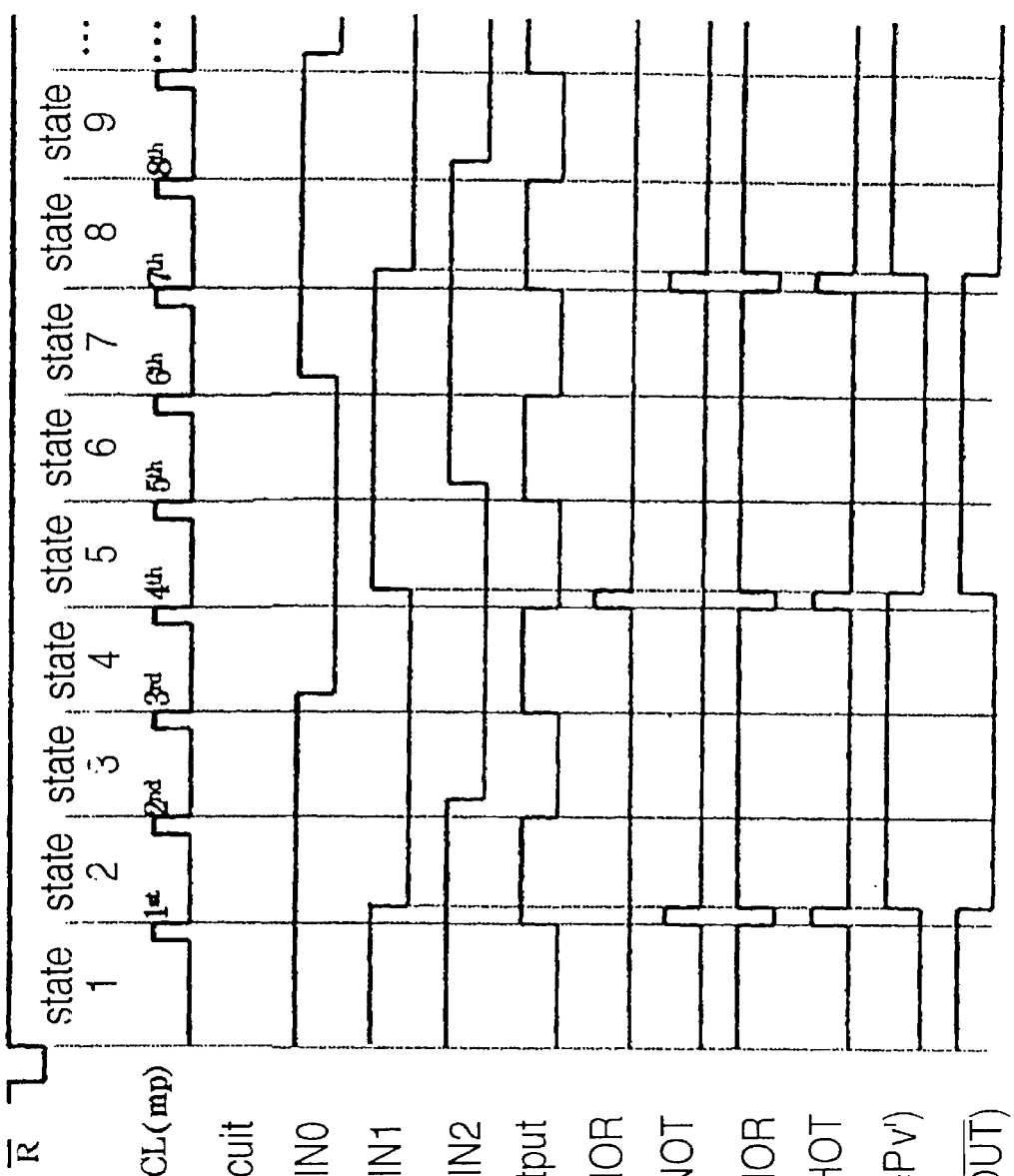
FIG. 11 is a timing chart illustrating an operation of the second output circuit shown in FIG. 8.
Figure 12:
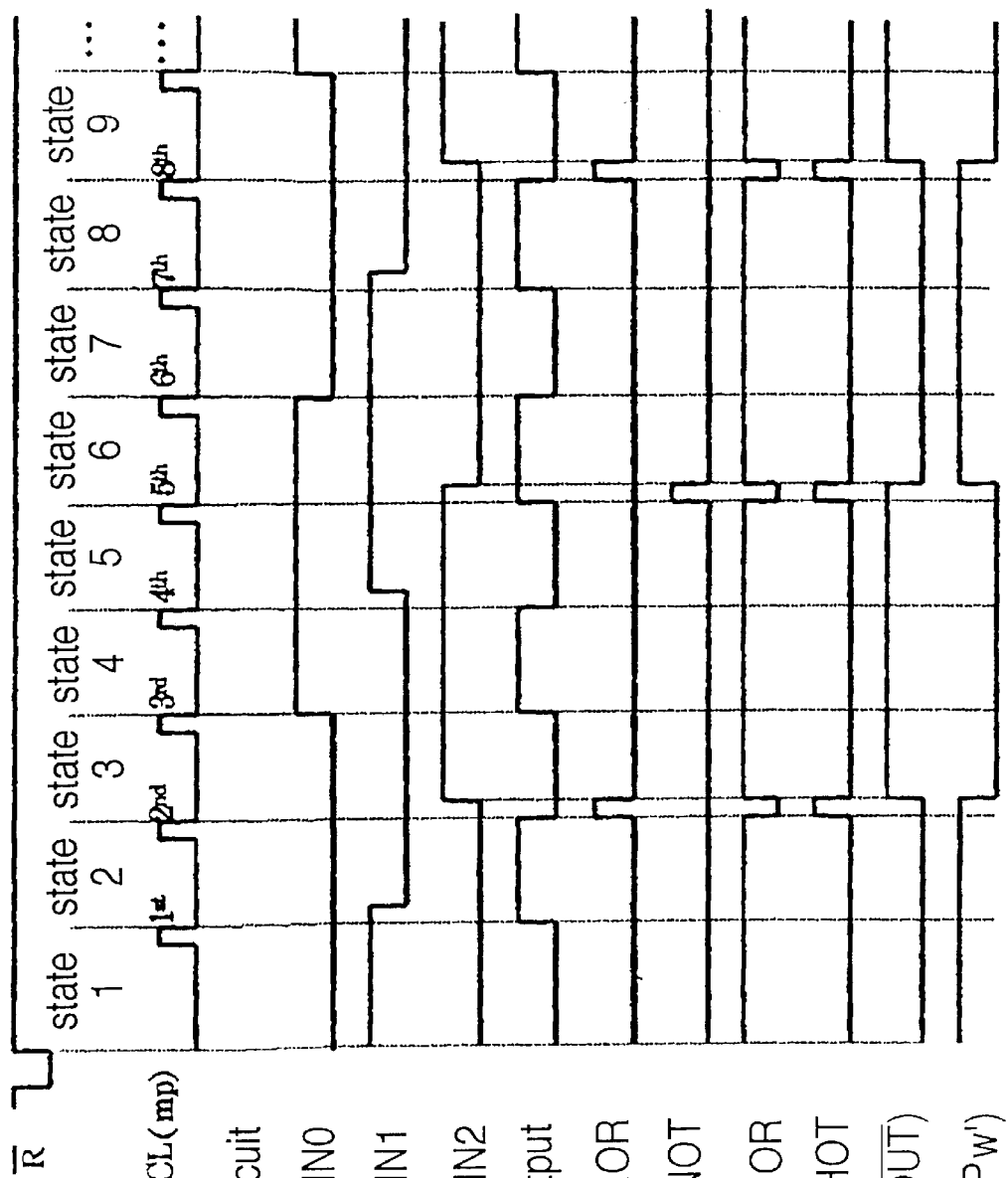
FIG. 12 is a timing chart illustrating an operation of the third output circuit shown in FIG. 9.
Figure 14:
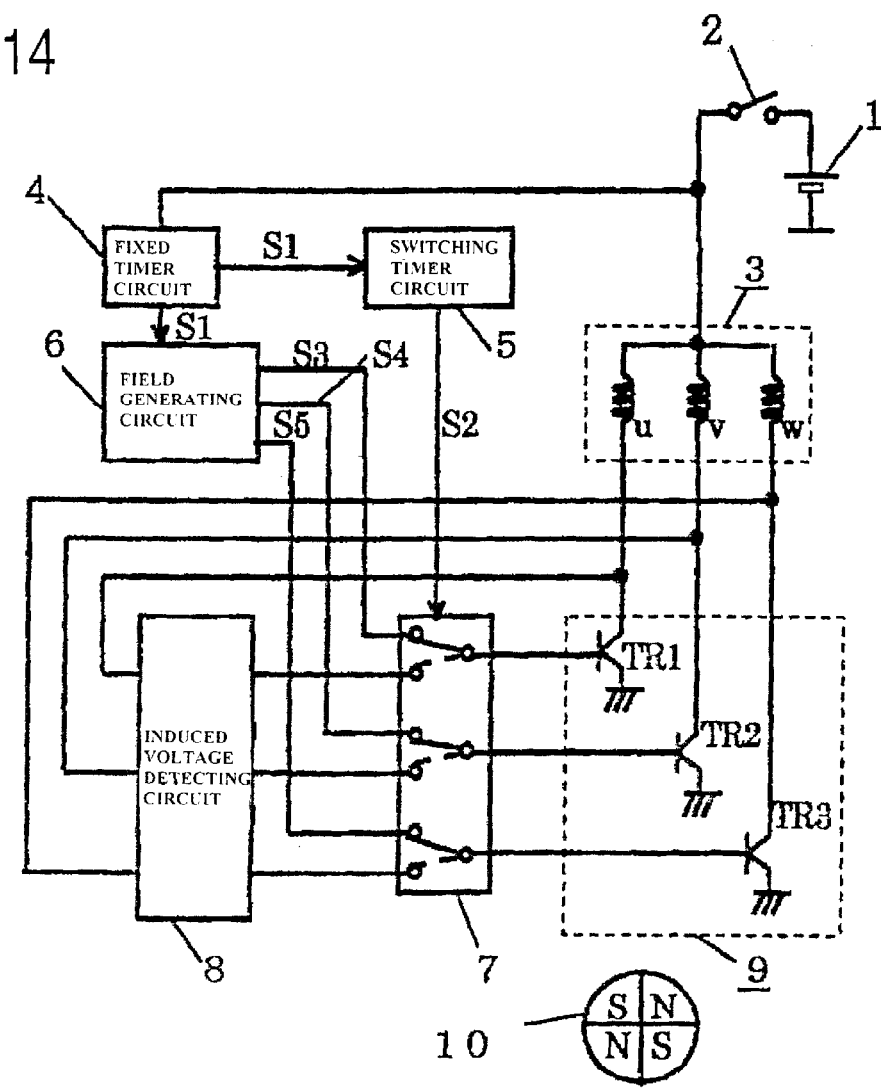
FIG. 14 is a block diagram at the prior art brushless motor driving device.
Figure 15:
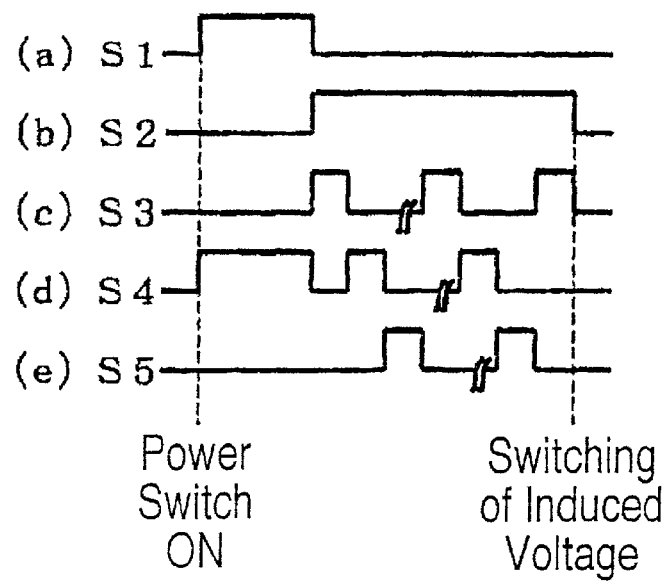
FIG. 15 is a timing chart illustrating an operation of the brushless motor driving device shown in FIG. 14.

Now, an operation of the three-phase starting pattern generating circuit 60 with reference to FIGS. 10 to 12. FIG. 10 is a timing chart illustrating an operation of the first output circuit 51. FIG. 11 is a timing chart illustrating an operation of the second output circuit 40. FIG. 12 is a timing chart illustrating an operation of the third output circuit 68

State 1

If it starts to drive the motor, the reset signal /R of the low level is outputted from the 2-input AND circuit 80 the respective output circuits 61, 62 and 63 of the three-phase starting pattern generating circuit 60, so that the T-type flipflops 64 and 70 in each output circuit are reset. If the T-type flipflops 64 and 70 in each output circuit are reset, the Q output of each of the T type flipflops 64 and 70 is brought to the low level, and the /Q output of each T-type flipflop is brought to the high level.

Accordingly, in the first output circuit 61, the output OUT, namely, the Q output of the T-type flipflop 70, and hence, the starting pattern P$_U$' is at the low level, and the output /OUT, namely, the /Q output of the T-type flipflop 70 is at the high level. In the second output circuit 62, the output OUT, namely, the Q output of the T-type flipflop 70, and hence, the starting pattern P$_V$' is at the low level, and the output /OUT, namely, the /Q output of the T-type flipflop 70 is at the high level. In the third output circuit 63, the output OUT, namely, the /Q output of the T-type flipflop 70, and hence, the starting pattern P$_W$' is at the high level, and the output /OUT, namely, the Q output of the T-type flipflop 70 is at the low level.

At this time, the inputs IN0, IN1 and IN2 of the output circuits 61, 62 and 63 receive the outputs OUT and /OUT of the output circuits 61, 62 and 63 as mentioned above. Therefore, the inputs IN0), IN1 and IN2 of the first output circuit 61 become the high level, the low level and the low level, respectively. The inputs IN0, IN1 and IN2 of the second output circuit 62 become the high level, the low level and the high level, respectively. The inputs IN0, IN1 and IN2 of the third output circuit to become the low level, the high level and the low level, respectively Accordingly, all of the inputs IN0, IN1 and IN2 of the second output circuit 62 become the high level. On the other hand, the input CL of the three-phase starting pattern generating circuit 60 is at the low level. Accordingly, in each of the output circuits 61, 62 and 63, the output of the T-type flipflop 64, the output of the 4-input NOR circuit 65 and the output of the NOT circuit 67 are at the low level, and the output of the 2-input NOR circuit 68 is at the high level. The output of the one shot circuit 69 and hence the input of the T-type flipflop 70 is at the low level. Thus, during the above mentioned State 1 (T1=132 ms), these levels are maintained since the input CL of the three-phase starting pattern generating circuit 60 is at the low level.

State 2

If the above mentioned State 1 has elapsed, the first pulse "mp" is outputted from the main counter 40 as mentioned above, so that the pulse "mp" is outputted to the input CL of the Q input CL of the three-phase starting pattern generating circuit 60. The T-type flipflop 64 in each output circuit 61, 62 and 63 fetches the falling edge of the first pulse "mp", so that the Q output of the T-type flipflop 64 becomes the high level. At this time, in only the second output circuit 62 having all the inputs IN0, IN1 and IN2 maintained at the high level, all the inputs of the 4-input NAND circuit 66 are brought to the high level, so that the output of the NOT circuit 67 is also brought to the high level, and therefore, the output of the 2-input NOR circuit 68 is brought to the low level. The one shot circuit 70 in the second output circuit 62 generates the one shot pulse at the falling edge of the output of the 2-input NOR circuit 68, and the one shot pulse is supplied to the T-type flipflop 70. The T-type flipflop 70 in the second output circuit 62 fetches the falling edge of the one shot pulse so that the Q output is brought to the high level and the /Q output is brought to the low level. Thus, file output OUT of the second output circuit 62 and hence the starting pattern $P_V'$ is brought to the high level and the output /OUT is brought to the low level.

At this time, the input IN1 of the first output circuit 61 receiving the output OUT of the second output circuit 62 is brought to the high level, and the input IN1 of each of the second and third output circuits 62 and 63, receiving the output /OUT of the second output circuit 62, is brought to the low level. Therefore, the input IN1 in the second output circuit 62 having had all the inputs IN0, IN1 and IN2 maintained at the high level, is brought to the low level, and on the other hand, in the third input circuit 63, all the inputs IN0, IN1 and IN2 are brought to the low level. At this time, accordingly, in the second output circuit 62, one input of the 4-input NAND circuit 66 is brought to the low level, so that the output of the NOT circuit 67 is brought to the low level, and the output of the 2-input NOR circuit 68 is brought to the high level. The input and output levels other than the above mentioned levels are maintained at the same level as those in the State 1. Thus, during the State 2 (T2=115 ms) until the second pulse "mp" is outputted from the main counter 40, these levels are maintained since the input CL of the three-phase starting pattern generating circuit 60 is at the low level.

State 3

If the above mentioned State 2 has elapsed, the second pulse "mp" is outputted from the main counter 40 as mentioned above, so that the pulse "mp" is outputted to the input CL of the input CL of the three-phase starting pattern generating circuit 60. The T-type flipflop 64 in each output circuit 61, 62 and 63 fetches the falling edge of the second pulse "mp", so that the Q output of the T-type flipflop 64 becomes the low level. At this time, in only the second output circuit 63 having all the inputs IN0, IN1 and IN2 maintained at the low level, all the inputs of the 4-input NOR circuit 65 are brought to the low level, so that the output of the NOR circuit 65 is brought to the high level, and therefore, the output of the 2-input NOR circuit 68 is brought to the low level. The one shot circuit 70 in the third output circuit 63 generates the one shot pulse at the falling edge of the output of the 2-input NOR circuit 68, and the one shot pulse is supplied to the T-type flipflop 70. The T-type flipflop 70 in the third output circuit 62 fetches the falling edge of the one shot pulse so that the Q output is brought to the high level and the /Q output is brought to the low level. Thus, the output OUT of the third output circuit 63 is brought to the low level and the output /OUT and hence the starting pattern $P_W'$ is brought to the high level.

At this time, the input IN2 of the second output circuit 61 receiving the output OUT of the third output circuit 63 is brought to the low level, and the input IN2 of each of the first and third output circuits 61 and 63, receiving the output /OUT of the third output circuit 63, is brought to the high level. Therefore, the input IN2 in the third output circuit 63 having had all the inputs IN0, IN1 and IN2 maintained at the low level, is brought to the high level, and on the other hand, in the first input circuit 61, all the inputs IN0, IN1 and IN2 are brought to the high level. At this time, accordingly, in the third output circuit 63, one input of the 4-input NOR circuit 65 is brought to the high level, so that the output of the NOR circuit 65 is brought to the low level, and the output of the 2-input NOR circuit 68 is brought to the high level. The input and output levels other than the above mentioned levels are maintained at the same level as those in the State 2. Thus, during the State 3 (T2=99 ms) until the third pulse "mp" is outputted from the main counter 40, these levels are maintain since the input CL of the three-phase starting pattern generating circuit 60 is at the low level.

State 4 and Succeeding States

A succeeding operation is similar, so that the starting patterns $P_U'$, $P_V'$ and $P_W'$ shown in FIGS. 10 to 12 are outputted from the three-phase starting pattern generating circuit 60. The starting patterns $P_U'$, $P_V'$ and $P_W'$ in the State 1 to State 6 are repeated in the named order in the State 7 and succeeding states.

As described above, the continuation time of each state is gradually shortened in the order of the State 1 to State 8 by shortening the full count value or the full count time of the clock signal CK, and is maintained at the constant value it the State 9 and the succeeding states. On the other hand, the starting patterns $P_U'$, $P_V'$ and $P_W'$ in the State 1 to State 6 are repeated in the named order in the State 7 and succeeding states.

Now, the rotation control of the motor 21 based on the starting patterns $P_U'$, $P_V'$ and $P_W'$ from the start circuit 30 will be described with reference to FIG. 13 which is a timing chart for illustrating an operation of the semiconductor integrated circuit shown in FIG. 1 at a starting time.

As shown at (a) in FIG. 13, if the clock signal CK, the reset signal /R of the low level and the low rotation detection signal ROT of the high level are supplied to the start circuit 30, the starting patterns $P_U'$, $P_V'$ and $P_W'$ shown at (b) in FIG. 13 are outputted from the start circuit 30 through the switch circuit 31 to the control circuit 35, while the state continuation time of each state is gradually shortened from T1=131 ms, T2=115 ms, . . . , T7=33 ms to T8=16 ms in the order of the State 1 to State 8, and is maintained at the constant time in T9, T10, . . . , T8=16 ms in and after the State 9, until the low rotation detection signal ROT from the low rotation detecting circuit 29 is brought to the low level.

If the starting patterns $P_U'$, $P_V'$ and $P_W'$ of "L, L, H" shown in the State 1 at (b) in FIG. 13 are outputted to the control circuit 35, the transistors Q2 and Q6 in the output bridge circuit 27 is timing-controlled as shown at (d) in FIG. 13, so that the current flows from the terminal V to the terminal W as shown at (c) in FIG. 13, through the V-phase armature coil 25 connected to the high side (power supply VDDand the W-phase armature coil 26 connected to the low side (ground). Thus, V-phase armature coil 25 and the W-phase armature coil 26 are excited so that as shown at (e) in FIG. 13, the N-pole and the S-pale of the rotator 36 are fixed to either a position (A) or a position (B) from an indefinite position.

Next, if the starting patterns $P_U'$, $P_V$ and $P_W'$ of "L, H, H" shown in the State 2 at (b) in FIG. 13 are outputted to the control circuit 35, the transistors Q1 and Q6 in the output bridge circuit 27 is timing-controlled as shown at (d) in FIG. 13, so that the current flows from the terminal U to the terminal W as shown at (c) in FIG. 13, through the: U-phase armature coil 24 connected to the high side (power supply VDD) and the W-phase armature coil 26 connected to the low side (ground). Thus, U-phase armature coil 24 and the W-phase armature coil 26 are excited so that as shown at (e) in FIG. 13, the N-pole and the S-pole of the rotator 36 start to rotate toward a position (C) either clockwise from the position (A) or counterclockwise from the position (R).

Furthermore, if the starting patterns $P_U'$, $P_U'$ and $P_W'$ of "L, H, L" shown in the State 3 at (b) in FIG. 13 are outputted to the control circuit 35, the transistors Q1 and Q5 in the output bridge circuit 27 is timing-controlled as shown at (d) in FIG. 13, so that the current flows from the terminal U to the terminal V as shown at (c) in FIG. 13, through the U-phase armature coil 24 connected to the high side (power supply VDD) and the V-phase armature coil 25 connected to the low side (ground). Thus, U-phase armature coil 24 and the V-phase armature coil 25 are excited so that as shown at (e) in FIG. 13, the N-pole and the S-pole of the rotator 36 rotate toward a position (D) clockwise from the position (C).

Thereafter, similarly, if the starting patterns $P_U'$, $P_V'$ and $P_W'$ shown in the State 4 to the State 5 at (b) in FIG. 13 are outputted to the control circuit 35, each two transistors in the output bridge circuit 27 is timing-controlled in the order of Q3 and Q5, Q3 and Q4, Q2 and Q4, Q2 and Q6, and Q1 and Q6, as shown at (d) in FIG. 13, so that as shown at (c) in FIG. 13, the current flows through the armature coil connected to the high side and the armature coil 25 connected to the low side (ground), in the order of W and V, W and U, V and U, V and W, U and W. Therefore, as shown at (e) in FIG. 13, the N-pole and the S-pole of the rotator 36 rotate clockwise from the position (D) while accelerating the rotation speed.

In the State 9 and the succeeding states, the starting patterns $P_U'$, $P_V'$ and $P_W'$ which are the same as the starting patterns $P_U'$, $P_V'$ and $P_W'$ in the State 3 to the State 8, respectively, are repeated in the named order with the same continuation time as that of the State 8, so that the N-pole and the S-pole of the stator 36 gradually accelerates the clock wise rotation. The control circuit 35 continues to control the rotation of the rotor 36 on the basis of the starting patterns $P_U'$, $P_V'$ and $P_W'$ supplied from the start circuit 30 until the rotation speed of the rotator 36 reaches the predetermined rotation speed so that the low rotation detection signal ROT of the low rotation detecting circuit 29 is brought to the low level.

As mentioned above, the starting patterns $P_U'$, $P_V'$ and $P_W'$ from the State 1 to the State 6 are repeated in the named order, and on the other hand, the continuation time of each state is shortened from the State 1 to State 8, in the order of states from T1=131 ms, T2=115 ms, . . . , T7=33 ms to T8=16 ms and is maintained at the constant time from the State 9 until the rotation speed of the rotator 36 reaches the predetermined rotation speed so that the low rotation detection signal ROT of the low rotation detecting circuit 29 is brought to the low level. Thus, the brushless motor driving device can shorten the starting time, and at the same time, can smoothly start the motor.

If the bit numbers of the main counter and/or the sub counter are changed, the exciting time in the starting operation can be arbitrarily set. In the above mentioned embodiment, the present invention is applied to a three-phase two-pole brushless motor, but it would be apparent to persons skilled in the art that the present invention can be applied to a three-phase four-pole brushless motor or a four phase brushless motor.

As seen from the above, according to the present invention, the start circuit is constituted of a main counter of n bits, a sub counter of m bits and a starting pattern generating circuit. At each time the main counter reaches a full count by counting the clock signal, the main counter generate a pulse, which is counted in the sub counter, and on the other hand, the full count value at the main counter is decreased in accordance with the count value of the sub counter, so that the full count time of the main counter is gradually shortened. Namely, the interval of the pulse generated by the main counter is gradually shortened. On the other hand, the starting pattern generating circuit generates the starting pattern in response to the pulse generated by the main counter. Thus, the starting pattern is maintained for the maximum continuation time at the beginning of the starting operation; and thereafter, at each time the starting pattern is changed, the continuation time of the starting pattern is gradually shortened with increasing of the rotating speed of the motor. Accordingly, the motor can he started smoothly with a shortened starting time. On the other hand, it is possible to arbitrarily set the exciting time in the starting operation by changing the bit numbers of the main counter and/or the sub counter.

The invention has thus been shown and described with reference to the specific embodiments. However, it should be noted that the present invention is in no way limited to the details of the illustrated structures but changes and modifications may be made within the scope of the appended claims.

What is claimed is:

1. A brushless motor driving device so configured to control excitation of each phase armature coil on the basis of starting pattern supplied from a start circuit in a starting operation and a rotator position signal obtained from an induced voltage generated between opposite ends of each phase armature coil after completion of the starting operation, thereby to rotate a rotator, wherein said start circuit includes a main counter generates a pulse at each time said main counter counts a clock signal to a variable full count value, a sub counter counts said pulse generated by said main counter, said variable full count value being subtracted by a count value of said sub counter, and a start pattern generating circuit generating a starting pattern in response to said pulse generated by said main counter.

2. A brushless motor driving device claimed in claim 1 wherein said sub counter is of m bits and said main counter is of n bits where m<n, and only m MSB bits of the full count value in said main counter is variable.

3. A brushless motor driving device claimed in claim 2:
wherein said main counter includes n flipflops connected to constitute a counter of n bits, a plurality of AND circuits each receiving an output of different flipflops of said n flipflops, and a plurality of selector circuits connected between an output of selected flipflops of said n flipflops and said AND circuits;
wherein said sub counter includes m flipflops connected to constitute a counter of m bits,
wherein each of said selector circuits receives a corresponding one bit of said m MSB bits of said main counter and a fixed logical level and is controlled by a corresponding one bit of said m bits of said sub counter to output said corresponding one be of said m MSB bits of said main counter when said corresponding ogre of said m bits of said sub counter is at a first logic level and said fixed logical level when said corresponding one of said m bits of said sub counter is at a second logic level.

4. A brushless motor driving device claimed in claim 3 further including a low rotation detecting circuit for detecting that a rotation speed of said rotor does not reach a predetermined value, and a switch circuit controlled by a low rotation detection signal outputted from sum low rotation detecting circuit to switch from said starting pattern to said rotor position signal when said rotation speed of said rotor reaches said predetermined value.

5. A brushless motor driving device claimed in claim 2 further including a low rotation detecting circuit for detecting that a rotation speed of said rotor does not reach a predetermined value, and a switch circuit controlled by a low rotation detection signal outputted from said low rotation detecting circuit to switch from said starting pattern to said rotor position signal when said rotation speed in said rotor reaches said predetermined value.

6. A brushless motor driving device claimed in claim 1 further including a Low rotation detecting circuit for detecting that a rotation speed of said rotor does not reach a predetermined value, and a switch circuit controlled by a low rotation detection signal outputted from said low rotation detecting circuit to switch from said starting pattern to said rotor position signal when said rotation speed of said rotor reaches said predetermined value.

* * * * *